(12) United States Patent
Cai et al.

(10) Patent No.: US 11,436,414 B2
(45) Date of Patent: Sep. 6, 2022

(54) DEVICE AND TEXT REPRESENTATION METHOD APPLIED TO SENTENCE EMBEDDING

(71) Applicant: Fei Cai, Changsha (CN)

(72) Inventors: Fei Cai, Changsha (CN); Honghui Chen, Changsha (CN); Junxian Liu, Changsha (CN); Aimin Luo, Changsha (CN); Zhen Shu, Changsha (CN); Tao Chen, Changsha (CN); Xueshan Luo, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 348 days.

(21) Appl. No.: 16/672,433

(22) Filed: Nov. 2, 2019

(65) Prior Publication Data

US 2020/0159832 A1 May 21, 2020

(30) Foreign Application Priority Data

Nov. 15, 2018 (CN) .......................... 201811361939.5

(51) Int. Cl.
*G06F 40/30* (2020.01)
*G06N 20/00* (2019.01)
(Continued)

(52) U.S. Cl.
CPC ............ *G06F 40/30* (2020.01); *G06F 40/211* (2020.01); *G06N 3/02* (2013.01)

(58) Field of Classification Search
CPC .... G06F 40/211; G06F 40/253; G06F 40/268; G06F 40/284; G06F 40/30; G06N 20/00
See application file for complete search history.

(56) References Cited

U.S. PATENT DOCUMENTS 9,129,008 B1 * 9/2015 Kuznetsov ............ G06F 16/438
11,023,675 B1 * 6/2021 Neervannan ............ G06F 40/30
(Continued)

OTHER PUBLICATIONS

Zheng et al., Hierarchical Collaborative Embedding for Context-Aware Recommendations, IEEE Inernational Confernce on Big Data (BIGDATA), 2017, pp. 867-876 (Year: 2017).*

(Continued)

*Primary Examiner* — Lamont M Spooner
(74) *Attorney, Agent, or Firm* — Dragon Sun Law Firm, PC; Jinggao Li, Esq.; Nathaniel Perkins

(57) ABSTRACT

The invention discloses a device and text representation method applied to sentence embedding, which has determining a parent word and a child words set corresponding to the parent word, obtaining an hidden interaction state of parent word based on the hidden interaction state of all child words; obtaining parent word sequence corresponding to the parent word and obtaining hidden state sequence corresponding to the hidden state of parent word; obtaining the interaction representation sequence of each parent word and other parent word based on the hidden state sequence, generating sentence embeddings. The invention proposes to realize sentence embeddings through a two-level interaction representation. The two-level interaction representation is local interaction representation and a global interaction representation respectively, and combines the two-level representation to generate a hybrid interaction representation, which can improve the accuracy and efficiency of sentence embeddings and be significantly better than the Tree-LSTM model in terms of accuracy.

6 Claims, 7 Drawing Sheets

(51) Int. Cl.
*G06F 40/211* (2020.01)
*G06N 3/02* (2006.01)

(56) References Cited

U.S. PATENT DOCUMENTS

| | | | | |
|---|---|---|---|---|
| 11,030,414 B2* | 6/2021 | Peters | ............... | G06F 40/295 |
| 11,205,043 B1* | 12/2021 | Neervannan | ......... | G06F 16/9532 |
| 11,205,044 B1* | 12/2021 | Neervannan | ........... | G06F 16/338 |
| 11,216,164 B1* | 1/2022 | Neervannan | ........... | G06Q 40/04 |
| 11,222,253 B2* | 1/2022 | Hashimoto | ........... | G06N 3/0454 |
| 11,227,109 B1* | 1/2022 | Neervannan | ............ | G06F 16/23 |
| 11,244,273 B1* | 2/2022 | Neervannan | ........... | G06F 16/338 |
| 11,281,739 B1* | 3/2022 | Neervannan | ........... | G06F 16/338 |
| 2014/0337320 A1* | 11/2014 | Hernandez | .......... | G06F 16/2465 |
| | | | | 707/722 |
| 2014/0358523 A1* | 12/2014 | Sheth | .................... | G06F 40/284 |
| | | | | 704/9 |
| 2015/0154002 A1* | 6/2015 | Weinstein | ............. | G06F 40/109 |
| | | | | 715/728 |
| 2017/0075978 A1* | 3/2017 | Zhang | .................... | G06F 40/216 |
| 2019/0188590 A1* | 6/2019 | Wu | ........................ | H04L 51/02 |
| 2019/0197109 A1* | 6/2019 | Peters | .................... | G06F 40/295 |
| 2019/0197121 A1* | 6/2019 | Jeon | ........................ | G10L 25/51 |
| 2020/0104366 A1* | 4/2020 | Xu | ......................... | G06N 5/022 |
| 2020/0126545 A1* | 4/2020 | Kakkar | ............... | G06K 9/6273 |
| 2020/0134035 A1* | 4/2020 | Rakshit | .............. | G06F 16/9532 |
| 2021/0185066 A1* | 6/2021 | Shah | ..................... | G06N 3/0445 |
| 2021/0312134 A1* | 10/2021 | Creed | .................... | G06F 40/237 |

OTHER PUBLICATIONS

Kiperwasser et al., Easy-First Dependency Parsing with Hierarchical Tree LSTMs, 2016, Transactions of the Association for Computational Linguistics, vol. 4, pp. 445-461. (Year: 2016).*

Huang et al., Encoding syntactic knowledge in neural networks for sentiment classification, 2017, journal={ACM Transactions on Information Systems (TOIS)}, vol. 35, No. 3, publisher={ACM New York, NY, USA} (Year: 2017).*

Dong et al., Adaptive recursive neural network for target-dependent twitter sentiment classification, 2014, Proceedings of the 52nd annual meeting of the association for computational linguistics (vol. 2: Short papers), pp. 49-54, year={2014} (Year: 2014).*

* cited by examiner

DEVICE AND TEXT REPRESENTATION METHOD APPLIED TO SENTENCE EMBEDDING

CROSS-REFERENCE TO RELATED APPLICATIONS

This application claims priority to Chinese Patent Application No. 201811361939.5 with a filing date of Nov. 15, 2018. The content of the aforementioned application, including any intervening amendments thereto, are incorporated herein by reference.

BACKGROUND OF THE INVENTION

Technical Field

The invention relates to the field of artificial intelligence technologies, more particularly to a device, a storage medium and a text representation method applied to sentence embedding.

Background Art

Sentence embedding maps text space to real-valued vectors or matrices, which plays an important role in machine understanding of text representation. Its applications include sentiment classification, question-answering systems and text summaries. The model on sentence embedding can be classified into the following three categories, namely, statistical embedded model, serialization embedded model and structured embedding model. Statistical embedded models are estimated based on statistical indicators, such as the frequency of co-occurring words, the co-occurrence word versus frequency and the weight of words in different texts (in the TF-IDF model). The serialization embedded model relies mainly on the neural network structure to learn text representation, based on a single layer of hidden layers, which is a convolutional neural network or a recurrent neural network (RNN). The structured embedding model considers the syntactic structure to reflect the semantics of the text, such as the recursive neural network and the long-short memory network (Tree-LSTM) of the tree structure.

The current sentence embedding model has achieved good results in text classification tasks. However, in the existing embedded model, the process of generating sentence embedding usually follows one-way action. That is to say, the representation generated by the previous text determines the representation of the next text, which is limited by the one-way effect, causing partial semantic loss.

SUMMARY OF THE INVENTION

The purpose of the invention is to provide a device, a storage medium and a text representation method applied to sentence embedding to improve the accuracy and efficiency of sentence embeddings.

According to one aspect of the invention, the invention provides a text representation method applied to sentence embedding, comprising: obtaining a file to be processed, extracting a sentence from the file; wherein the file includes a text file and a webpage file; obtaining n parent word corresponding to n words in the sentence; determining the parent word and the child words set C(p) corresponding to the parent word, setting hidden states $h_k$ and memory cells $c_k$ for each child words in the C(p), wherein $k \in \{1, 2, \ldots, |C(p)|\}$, $|C(p)|$ is the number of child words in the C(p); obtaining a hidden interaction state $\tilde{h}_p$ of the parent word based on a hidden interaction state of all child words in the C(p); inputting the $\tilde{h}_p$ and the parent word into the LSTM cell to obtain the memory cells and hidden states of the parent word; obtaining a sequence of the parent word $\{x_1, x_2, \ldots, x_n\}$ corresponding to then parent word and obtaining a hidden state sequence $\{h_1, h_2, \ldots, h_n\}$ corresponding to the $\{x_1, x_2, \ldots, x_n\}$ based on the hidden state of the parent word; obtaining the interaction representation sequence $\{r_1, r_2, \ldots, r_n\}$ of each parent word and other parent word in the $\{x_1, x_2, \ldots, x_n\}$ based on $\{h_1, h_2, \ldots, h_n\}$, generating sentence embeddings based on the $\{r_1, r_2, \ldots, r_n\}$.

Optionally, the memory cells and hidden states of the parent word comprises: the parent word $x_p$ is converted into a hidden representation $\overline{h_p} = \tanh(W^{(h)} x_p + b^h)$; wherein $W^{(h)}$ and $b^h$ are the weight matrix and the bias term, respectively; connecting the parent word $x_p$ and the $k^{th}$ child words corresponding to the parent word $x_p$, obtaining $\alpha_k = \overline{h_p} W_\alpha h_k$, wherein $\alpha_k$ is a connective representation of both $\overline{h_p}$ and the hidden state $h_k$, $W_\alpha$ is the connective matrix to be learned; calculating the word weight $$\lambda_k = \frac{\exp(\alpha_k)}{\sum_{i=1}^{|C(p)|} \exp(\alpha_i)}$$

of the $k^{th}$ child words in the parent word $x_p$; obtaining the hidden interaction state $$\tilde{h}_p = \sum_{i \in C(j)} \lambda_i h_i$$

that relates to all child states of the parent word $x_p$; inputting the $\tilde{h}_p$ and the parent word $x_p$ into the LSTM cell, obtaining the memory cells and hidden states of the parent word $x_p$.

Optionally, inputting the $\tilde{h}_p$ and the parent word $x_p$ into the LSTM cell, obtaining the memory cells and hidden states of the parent word $x_p$ comprises: using the hidden interaction state $\tilde{h}_p$ and the parent word $x_p$ as the input to the LSTM cell to get:

$$i_p = \sigma(U^{(i)} x_p + W^{(i)} \tilde{h}_p + b^{(i)});$$

$$o_p = \sigma(U^{(o)} x_p + W^{(o)} \tilde{h}_p + b^{(o)});$$

$$u_p = \tanh(U^{(u)} x_p + W^{(u)} \tilde{h}_p + b^{(u)});$$

$$f_{kp} = \sigma(U^{(f)} x_p + W^{(f)} h_k + b^{(f)});$$

wherein $i_p$, $o_p$ and $f_{kp}$ are the input gate, the output gate and the forget gate, respectively; $u_p$ is the candidate hidden state of $x_p$; the corresponding weight matrix of $x_p$ are $U^{(i)}$, $U^{(o)}$, $U^{(u)}$, and $U^{(f)}$, the corresponding weight matrix of $\tilde{h}_p$ or $h_k$ are $W^{(i)}$, $W^{(o)}$, $W^{(u)}$ and $W^{(f)}$, the bias terms are $b^{(i)}$, $b^{(o)}$, $b^{(u)}$ and $b^{(f)}$;

obtaining the memory cell of the parent word $x_p$, the memory cell is represented as:

$$c_p = i_p \odot u_p + \sum_{k=1}^{|C(p)|} f_{kp} \odot c_k;$$

obtaining the hidden state of the parent word $x_p$, the hidden state is represented as:

$$h_p = o_p \odot \tanh(c_p).$$

Optionally, based on the $\{r_1, r_2, \ldots, r_n\}$ generating sentence embeddings comprises: obtaining the connective representation sequence $\{\alpha_{g1}, \alpha_{g2}, \ldots, \alpha_{gn}\}$ between the word $x_g$ in the $\{x_1, x_2, \ldots, x_n\}$ and other words; calculating the interaction weight of word $x_k$ and word $x_g$ in the $\{x_1, x_2, \ldots, x_n\}$, get:

$$\lambda_{gk} = \frac{\exp(\alpha_{gk})}{\sum_{i=1}^{n} \exp(\alpha_{gi})};$$

the interaction representation of $x_g$ in $\{x_1, x_2, \ldots, x_n\}$ is represented as:

$$r_g = \sum_{i=1}^{n} \lambda_{gi} h_i;$$

enumerating all the words in the $\{x_1, x_2, \ldots, x_n\}$, obtaining the interaction representation sequence $\{r_1, r_2, \ldots, r_n\}$ of $\{x_1, x_2, \ldots, x_n\}$, generating the sentence embeddings $s = \max\{r_1, r_2, \ldots, r_n\}$.

Optionally, obtaining the predicted label corresponding to the sentence embeddings s:

$$\hat{s} = \arg\max p(\mathcal{Y}|s);$$

wherein $\hat{s} \in \mathcal{Y}$, $\mathcal{Y}$ is the class label set; $p(\mathcal{Y}|s) = \text{softmax}(W^{(s)}s + b^{(s)})$; $W^{(s)}$ and $b^{(s)}$ are the reshape matrix and the bias term, respectively;

setting the loss function:

$$L = \frac{1}{n}\sum_{i=1}^{n} \log p(\tilde{w}_i|h_i) - \log p(\tilde{s}|s);$$

wherein $h_i$ is the hidden state, $\tilde{w}_i$ is the true class label of word $x_i$, $\tilde{s}$ is the true class label of sentence embeddings s; evaluating the quality of the sentence embeddings s based on the loss function.

According to a second aspect of the invention, the invention provides a text representation device applied to sentence embedding, comprising: a word extraction module, configured to obtain a file to be processed and extract a sentence from the file; wherein the file includes: a text file, a webpage file; obtaining n parent word corresponding to n words in the sentence; a child word processing module, configured to determine the parent word and a child word set C(p) corresponding to the parent word, setting hidden states $h_k$ and memory cells $c_k$ for each child words in the C(p), wherein $k \in \{1, 2, \ldots, |C(p)|\}$; a parent word processing module, configured to obtain hidden interaction states $\tilde{h}_p$ of the parent word based on the hidden interaction states of all child words in the C(p); inputting the $\tilde{h}_p$ and the parent word into the LSTM cell to obtain the memory cells and hidden states of parent word; a hidden state processing module, configured to obtain a sequence $\{x_1, x_2, \ldots, x_n\}$ of parent word corresponding to n parent word as well as obtain a hidden state sequence $\{h_1, h_2, \ldots, h_n\}$ corresponding to the $\{x_1, x_2, \ldots, x_n\}$ based on the hidden state of parent word; a sentence embedding processing module, configured to obtain a interaction representation sequence $\{r_1, r_2, \ldots, r_n\}$ of each parent words and other parent words in $\{x_1, x_2, \ldots, x_n\}$ based on the $\{h_1, h_2, \ldots, h_n\}$, generating sentence embeddings based on the $\{r_1, r_2, \ldots, r_n\}$.

Optionally, the parent word processing module comprises: a hidden representation unit, configured to convert the parent word $x_p$ into a hidden representation $\overline{h}_p = \tanh(W^{(h)}x_p + b^h)$; wherein, $W^{(h)}$ and $b^h$ are the weight matrix and the bias term, respectively; a connective processing unit, configured to connect the $k^{th}$ child words corresponding to the parent word $x_p$ and the parent word $x_p$, obtaining $\alpha_k = \overline{h}_p W_\alpha h_k$, wherein $\alpha_k$ is the connective representation of $\overline{h}_p$ and $h_k$, $W_\alpha$ is a connective matrix; a hidden state extracting unit, configured to calculate the word weight $$\lambda_k = \frac{\exp(\alpha_k)}{\sum_{i=1}^{|C(p)|} \exp(\alpha_i)}$$

of the $k^{th}$ child words of the parent word $x_p$; obtaining a hidden interaction state $$\tilde{h}_p = \sum_{i \in C(j)} \lambda_i h_i$$

of the parent word $x_p$; inputting the $\tilde{h}_p$ and the parent word $x_p$ into the LSTM cell to obtain the memory cells and hidden states of the parent word $x_p$.

Optionally, the hidden state processing module, configured to use the hidden interaction state $\tilde{h}_p$ and the parent word $x_p$ as the input to the LSTM cell to get:

$$i_p = \sigma(U^{(i)}x_p + W^{(i)}\tilde{h}_p + b^{(i)});$$

$$o_p = \sigma(U^{(o)}x_p + W^{(o)}\tilde{h}_p + b^{(o)});$$

$$u_p = \tanh(U^{(u)}x_p + W^{(u)}\tilde{h}_p + b^{(u)});$$

$$f_{kp} = \sigma(U^{(f)}x_p + W^{(f)}h_k + b^{(f)});$$

wherein $i_p$, $o_p$ and $f_{kp}$ are the input gate, output gate and forget gate, respectively; $u_p$ is the candidate hidden state of $x_p$; the corresponding weight matrix of $x_p$ are $U^{(i)}$, $U^{(o)}$, $U^{(u)}$ and $U^{(f)}$, the corresponding weight matrix of $\tilde{h}_p$ or $h_k$ are $W^{(i)}$, $W^{(o)}$, $W^{(u)}$ and $W^{(f)}$, the bias terms are $b^{(i)}$, $b^{(o)}$, $b^{(u)}$ and $b^{(f)}$;

the hidden state processing module, configured to obtain the memory cell of the parent word $x_p$, the memory cell is represented as:

$$c_p = i_p \odot u_p + \sum_{k=1}^{|C(p)|} f_{kp} \odot c_k;$$

the hidden state processing module, configured to obtain the hidden state of the parent word $x_p$, the hidden state is represented as:

$$h_p = o_p \odot \tanh(c_p).$$

Optionally, the sentence embedding processing module, configured to obtain the connective representation sequence $\{\alpha_{g1}, \alpha_{g2}, \ldots, \alpha_{gn}\}$ between the word $x_g$ in the $\{x_1, x_2, \ldots, x_n\}$ and other words; calculating the interaction weight of word $x_k$ and word $x_g$ in the $\{x_1, x_2, \ldots, x_n\}$, get:

$$\lambda_{gk} = \frac{\exp(\alpha_{gk})}{\sum_{i=1}^{n}\exp(\alpha_{gi})};$$

the sentence embedding processing module, configured to obtain the interaction representation of $x_g$ in $\{x_1, x_2, \ldots, x_n\}$, which can be represented as:

$$r_g = \sum_{i=1}^{n}\lambda_{gi}h_i;$$

the sentence embedding processing module, configured to enumerate all the words in the $\{x_1, x_2, \ldots, x_n\}$, obtaining the interaction representation sequence $\{r_1, r_2, \ldots, r_n\}$ of the $\{x_1, x_2, \ldots, x_n\}$, generating the sentence embeddings $s = \max\{r_1, r_2, \ldots, r_n\}$.

Optionally, a quality evaluation module, configured to obtain the predicted label corresponding to the sentence embeddings s:

$$\hat{s} = \arg\max p(\mathcal{Y}|s);$$

wherein $\hat{s} \in \mathcal{Y}$, $\mathcal{Y}$ is the class label set; $p(\mathcal{Y}|s) = \text{softmax}(W^{(s)}s + b^{(s)})$; $W^{(s)}$ and $b^{(s)}$ are the reshape matrix and the bias term, respectively; the quality evaluation module, configured to set the loss function:

$$L = -\frac{1}{n}\sum_{i=1}^{n}\log p(\tilde{w}_i|h_i) - \log p(\tilde{s}|s);$$

wherein $h_i$ is the hidden state, $\tilde{w}_i$ is the true class label of word $x_i$, $\tilde{s}$ is the true class label of sentence embeddings s; evaluating the quality of the sentence embeddings s based on the loss function.

According to a third aspect of the invention, the invention provides a text representation device applied to sentence embedding, comprising: a memorizer; a processor coupled to the memorizer; the processor is configured to perform the aforementioned method based on instructions stored in the memorizer.

According to a fourth aspect of the invention, the invention provides a computer readable storage medium, storing computer program instructions, implements the steps of the aforementioned method when the instructions are executed by the processor.

The invention proposes to realize sentence embeddings through a two-level interaction representation. The two-level interaction representation is a local interaction representation (LIR) and a global interaction representation (GIR), respectively. The invention combines the two-level representation to generate a hybrid interaction representation (HIR), which can improve the accuracy and efficiency of sentence embeddings and be significantly better than the Tree-LSTM model in terms of accuracy.

DETAILED DESCRIPTION OF THE PREFERRED EMBODIMENTS

The embodiments of the invention can be applied to computer systems/servers, being able to operate with general-use or special-use computing system environments or configurations. The embodiments is able to be applied to computing systems, computing environments, and/or configurations suitable for using with a computer system/server, including but not limited to: a smartphone, a personal computer system, a server computer system, a thin client, a thick client, a handheld or a laptop devices, microprocessor-based systems, set-top boxes, programmable consumer electronics, network personal computers, small computer systems, large computer systems and distributed cloud computing technology environments including any of the above systems, etc.

The computer system/server can be described in the general context of computer system executable instructions (such as program modules) being executed by a computer system. Generally, program modules include routines, programs, target programs, components, logic and data structures, etc. They perform particular tasks or implement particular abstract data types. The computer system/server can be implemented in a distributed cloud computing environment where tasks are performed by remote processing devices that are linked through a communication network. In a distributed cloud computing environment, program modules can be located on a local or remote computing system storage medium including storage devices.

Figure 1:
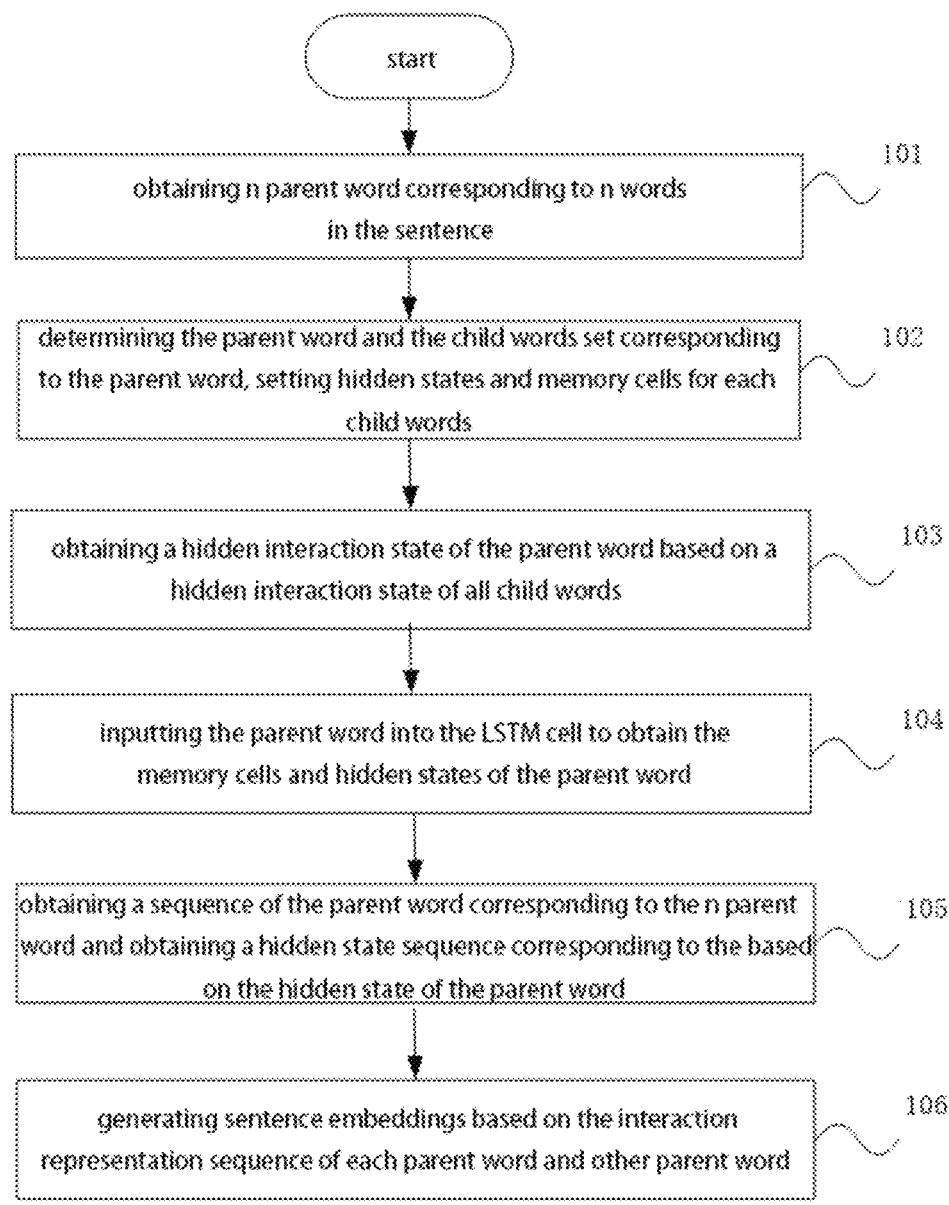
FIG. 1 is a schematic flow chart of an embodiment of a text representation method applied to sentence embedding according to the invention.

FIG. 1 is a schematic flow chart of an embodiment of a text representation method applied to sentence embedding according to the invention. As illustrated in FIG. 1:

Step 101, obtaining n parent word corresponding to n words in the sentence.

obtaining a file to be processed, extracting a sentence from the file, analyzing and processing the sentence; wherein the file includes a text file, a webpage file and so on. For instance, the back-end system of the e-commerce website obtains an evaluation document about electronic products. In the evaluation document, there are different customers' comments on the electronic products. The sentences related to the comments are extracted from the evaluation document based on the extraction rules, processing the sentences correspondingly.

Step 102, determining the parent word, and the child words set C(p) corresponding to the parent word, setting hidden states $h_k$ and memory cells $c_k$ for each child words in the C(p), wherein k∈{1, 2, . . . ,|C(p)|}.

For example, for a sentence 'a dog crossing a ditch', the sentence is based on a grammatical dependency, the parent word is 'crossed' and the child word set is 'a dog, a ditch'. Hidden states $h_k$ and memory cells $c_k$ are inherent components of recurrent neural networks. The hidden state is used to record the state representation in the network at the current time, while the memory cell is used to record the state information of the network from the beginning to the present.

Step 103, obtaining a hidden interaction state $\tilde{h}_p$ of the parent word based on a hidden interaction state of all child words in the C(p). The hidden state and the hidden interaction state are different concepts. The hidden state is inherent to the RNN neural network, while the hidden interaction state is a hidden state representation obtained by the interaction between the parent word and the child words.

Step 104, inputting $\tilde{h}_p$ the and the parent word into the LSTM cell to obtain the memory cells and hidden states of the parent word;

Step 105, obtaining a sequence of the parent word $\{x_1, x_2, \ldots, x_n\}$ corresponding to the n parent word and obtaining a hidden state sequence $\{h_1, h_2, \ldots, h_n\}$ corresponding to the $\{x_1, x_2, \ldots, x_n\}$ based on the hidden state of the parent word.

Step 106, obtaining the interaction representation sequence $\{r_1, r_2, \ldots, r_n\}$ of each parent word and other parent word in the $\{x_1, x_2, \ldots, x_n\}$ based on $\{h_1, h_2, \ldots, h_n\}$, generating sentence embeddings based on the $\{r_1, r_2, \ldots, r_n\}$.

The sentence embedding can help machine understand the text. The semantics of the text is the product of the mutual influence of the words in the text. The subsequent words also contribute to the semantics of the previous words. The embodiment introduces the concept of interaction, proposing a two-level interaction representation applied to sentence embedding, namely a local interaction representation and a global interaction representation. Combining the two interaction representations provides a hybrid interaction representation. For example, a local interaction representation (LIR) and a global interaction representation (GIR) generates a hybrid interaction representation (HIR).

Apply a softmax function on a sequence of connective representations $\{\alpha_1, \alpha_2, \ldots, \alpha_{|C(p)|}\}$ to get the weight $\lambda_k$. Calculate the word weight $$\lambda_k = \frac{\exp(\alpha_k)}{\sum_{i=1}^{|C(p)|} \exp(\alpha_i)}$$

of the $k^{th}$ child words in the parent word $x_p$. Obtain the hidden interaction state $$\tilde{h}_p = \sum_{i \in C(j)} \lambda_i h_i$$

that relates to all child states of the parent word $x_p$; in the action child words→parent word, input the $\tilde{h}_p$ and the parent word into the LSTM cell to obtain the memory cells and hidden states of the parent word $x_p$. LSTM (Long Short-Term Memory) is a long-term and short-term memory network. It is a time recurrent neural network suitable for processing and predicting important events with relatively long intervals and delays in time series.

Use the hidden interaction state $\tilde{h}_p$ and the parent word $x_p$ as the input to the LSTM cell to get:

$i_p = \sigma(U^{(i)}x_p + W^{(i)}\tilde{h}_p + b^{(i)})$;

$o_p = \sigma(U^{(o)}x_p + W^{(o)}\tilde{h}_p + b^{(o)})$;

$u_p = \tanh(U^{(u)}x_p + W^{(u)}\tilde{h}_p + b^{(u)})$;

$f_{kp} = \sigma(U^{(f)}x_p + W^{(f)}h_k + b^{(f)})$;

wherein $i_p$, $o_p$ and $f_{kp}$ are the input gate, the output gate and the forget gate, respectively; $u_p$ is the candidate hidden state of $x_p$; the corresponding weight matrix of $x_p$ are $U^{(i)}$, $U^{(o)}$, $U^{(u)}$ and $U^{(f)}$, the corresponding weight matrix of $\tilde{h}_p$ or $h_k$ are $W^{(i)}$, $W^{(o)}$, $W^{(u)}$ and $W^{(f)}$, the bias terms are $b^{(i)}$, $b^{(o)}$, $b^{(u)}$ and $b^{(f)}$.

Obtain the memory cell of the parent word $x_p$, the memory cell is represented as:

$$c_p = i_p \odot u_p + \sum_{k=1}^{|C(p)|} f_{kp} \odot c_k;$$

obtain the hidden state of the parent word $x_p$, the hidden state is represented as:

$h_p = o_p \odot \tanh(c_p)$;

wherein $\odot$ is the element multiplication, while $c_k$ is the memory cells of a child word.

For example, supposing there is a synthetic parse tree, wherein $x_l$ represents a left child word and $x_r$ represents a right child word of the parent word $x_p$. The parent word $x_p$ is a non-terminating word (i.e. $x_p$ is a zero vector), using $x_l$ and $x_r$ as controllers instead of $x_p$. Therefore, based on the above formula, the hidden interaction state $\tilde{h}_l$ and $\tilde{h}_r$ can be obtained separately according to the $x_l$ and the $x_r$. Connect the $\tilde{h}_l$ and the $\tilde{h}_r$ to represent the hidden interaction state representation of the parent word, which is $\tilde{h}_p = [\tilde{h}_l : \tilde{h}_r]$. According to the above formula, it is able to obtain the memory cells $c_p$ and hidden states $h_p$ of the parent word $x_p$. In the local interaction representation of the child word→parent word, the parent word contains all the information of child words. Therefore, the hidden state of this parent word can be embedded as a sentence.

In one embodiment, the GIR employs an enumeration-based strategy to utilize the attention mechanism for all words in a sentence. After applying the Tree-LSTM module to n words in a sentence, it is able to obtain the hidden representation $\{h^1, h_2, \ldots, h_n\}$ corresponding to the word sequence $\{x_1, x_2, \ldots, x_n\}$. Tree-LSTM is similar to RNN. After inputting the word sequence $\{x_1, x_2, \ldots, x_n\}$ into the network in time series, it correspondingly obtains the hidden state representation of each moment.

In order to represent the interaction of word $x_g$ with the other words in one sentence, the word $x_g$ can be recognized as a semantic weights controller in the $\{x_1, x_2, \ldots, x_n\}$ besides word $x_g$. A common connection is applied to connect word $x_g$ to the other words, i.e. $\alpha_{gk} = h_g W_\alpha h_k$, wherein $\alpha_{gk}$ is the connective representation of $h_g$ and $h_k$ (g, k∈(1, 2, . . . , n)). It is able to obtain all the connective representation $\{\alpha_{g1}, \alpha_{g2}, \ldots, \alpha_{gn}\}$ between word $x_g$ and the other words.

The softmax function maps the original output to the probability space of (0, 1), while the sum of these values equals to 1. Supposing there is an array V, Vi represents the i-th element in V, then the softmax value of this element is:

$$S_i = \frac{e^{V_i}}{\sum_j e^{V_j}}.$$

Apply the softmax function to connective representation sequence to calculate the weight, calculating the interaction weight of word $x_k$ and word $x_g$ in the $\{x_1, x_2, \ldots, x_n\}$, get:

$$\lambda_{gk} = \frac{\exp(\alpha_{gk})}{\sum_{i=1}^{n} \exp(\alpha_{gi})};$$

wherein $\lambda_{gk}$ is the interaction weight of word $x_k$ and word $x_g$ in the $\{x_1, x_2, \ldots, x_n\}$. Finally, the interaction representation of word $x_g$ in the $\{x_1, x_2, \ldots, x_n\}$ is represented as:

$$r_g = \sum_{i=1}^{n} \lambda_{gi} h_i;$$

it is able to enumerate all the words in a sentence and return to the interaction representation sequence, i.e. $\{r_1, r_2, \ldots, r_n\}$. The max-pooling method refers to maximizing sampling in a specified dimension, in other words, it obtains the maximum value of the dimension. Sentence embedding refers to sentence representation, which represents the sentence as a low-dimensional and dense vector, which is convenient for the computer to understand and calculate.

Apply max-pooling method to generate the final sentence embeddings s in the sequence, $s=\max\{r_1, r_2, \ldots, r_n\}$, completing to define the global interaction representation. That is: enumerating all the words in the $\{x_1, x_2, \ldots, x_n\}$, obtaining the interaction representation sequence $\{r_1, r_2, \ldots, r_n\}$ of the $\{x_1, x_2, \ldots, x_n\}$, generating sentence embedding $s=\max\{r_1, r_2, \ldots, r_n\}$.

In order to obtain the local and global interaction between words, LIR and GIR are integrated to form a hybrid interaction representation HIR. The HIR first generates a hidden state sequence $\{h_1, h_2, \ldots, h_n\}$ corresponding to the word sequence $\{x_1, x_2, \ldots, x_n\}$ based on the steps of LIR. Then, the HIR apply the process of GIR in the hidden state sequence to obtain the final sentence embeddings s.

In one embodiment, obtain the predicted label corresponding to the sentence embeddings s:

$$\hat{s} = \arg\max p(\mathcal{Y} | s);$$

wherein $\hat{s} \in \mathcal{Y}$, $\mathcal{Y}$ is the class label set; $p(\mathcal{Y}|s)=\text{softmax}(W^{(s)}s+b^{(s)})$; $W^{(s)}$ and $b^{(s)}$ are the reshape matrix and the bias term, respectively.

Set the loss function:

$$L = -\frac{1}{n}\sum_{i=1}^{n} \log p(\tilde{w}_i | h_i) - \log p(\tilde{s} | s);$$

wherein $h_i$ is the hidden state, $\tilde{w}_i$ is the true class label of word $x_i$, $\tilde{s}$ is the true class label of sentence embeddings s. Evaluate the quality of the sentence embeddings s based on the loss function.

In the category prediction process, apply a sotfmax classifier to the sentence embedding to obtain a predicted label ŝ, wherein $\hat{s} \in \mathcal{Y}$, $\mathcal{Y}$ is a class label set, i.e.:

$$\hat{s} = \arg\max p(\mathcal{Y} | s).$$

and $$p(\mathcal{Y}|s) = \text{softmax}(W^{(s)}s+b^{(s)})$$

wherein $W^{(s)}$ and $b^{(s)}$ are the reshape matrix and the bias term, respectively. For the loss function in the formulated HIR, the corresponding losses in LIR and GIR can be combined as follows:

$$L = -\frac{1}{n}\sum_{i=1}^{n} \log p(\tilde{w}_i | h_i) - \log p(\tilde{s} | s);$$

wherein the former's loss derives from LIR and the latter's loss derives from GIR. The $h_i$ is the hidden state, while $\tilde{w}_i$ is the true class label of the word $x_i$ in the LIR, $\tilde{s}$ is the true class label of the sentence embeddings s in the GIR.

In order to evaluate the quality of the proposed sentence embedding, consider an emotional classification task and try to answer the following question; (RQ1) Can the sentence embedding model combined with the interaction representation improve the performance of sentiment classification? (RQ2) What is the effect of the length of the sentence on performance?

Compare the performance of the methods provided by the embodiment with other recent recursive neural network based nested models. The following benchmark models can be used for comparison: (1) LSTM: A nested model based on long and short memory networks [6]. (2) Tree-LSTM: An LSTM-based nested model that combines a parse tree. They are compared with the model corresponding to the sentence nesting method proposed by the embodiment: (1) LIR (2.1), (2) GIR (2.2), and (3) HIR (2.3).

Use the Stanford Sentiment Treebank dataset sampled from the film review. The data set has five types of labels for each sentence: very negative, negative, medium, positive, and very positive. In addition, the data set discards some medium sentences to divide the label into two categories, negative and positive. This data set can be used as a 2-class classification task or 5-class classification task. Table 1 below details the statistical characteristics of this data set. The accuracy of use (at the sentence level) is recognized as the evaluation criterion for the discussion model.

TABLE 1

Statistical characteristics of the data set

| Variable | | 5-class Task | 2-class Task |
|---|---|---|---|
| #Sentence (train/dev/test) | | 8544/1101/2210 | 6920/872/1821 |
| #Maximal length | sentence | 56 | 56 |
| #Average length | sentence | 19.31 | 19.17 |
| #Vocabulary | | 21701 | 21701 |

For word embedding, the random initialization word embedding matrix $W_e$, which will be learned during the training phase, setting the word embedding dimension to 300. The fixed parameters are set as follows: the batch size is set to 5, which is 5 sentences per batch; the hidden vector dimension is set to 150; the loss rate is set to 0.5. To initialize the neural network, each matrix is initialized by a normal Gaussian distribution and each bias term is initialized with a zero vector. In addition, the model was trained by using the AdaGrad algorithm with a learning rate of 0.05 and the entire training process was set to 15 cycles.

In order to answer RQ1, in Table 2, the experimental results of the five-class classification task and the two-class classification task of all the discussion models are presented. Table 2 shows the accuracy on the sentiment classification task. The best benchmark model and the best performance model in each column are underlined and bolded, respectively.

TABLE 2

Accuracy on sentiment classification tasks

| Model | 5-class Task | 2-class Task |
|---|---|---|
| LSTM | .4223 | .8085 |
| Tree-LSTM | .4548 | .8483 |
| LIR | .4601 | .8506 |
| GIR | .4609 | .8529 |
| HIR | .4691 | .8655 |

For the benchmark model, Tree-LSTM outperforms LSTM, achieving 7.67% and 4.92% accuracy improvement on 5-class and 2-class classification tasks, which means that the grammatical structure is combined with the serialized nested model. Structured sentence embedding models do better represent text for sentence classification. Models with interaction representations, such as LIR, GIR, and HIR, are generally superior to benchmark models. HIR is the best performing model in the proposed model. In the five-class classification task, HIR has a 3.15% accuracy improvement for the best benchmark model Tree-LSTM, and a 1.96% and 1.97% improvement for GIR and LIR, respectively. In the 2-class classification task, compared with Tree-LSTM, GIR and LIR, the HIR reached 2.03%, 1.48% and 1.78% accuracy respectively. By characterizing the local and global interactions between words, HIR can achieve better sentence embedding, which is conducive to emotional classification.

GIR, like HIR, is also superior to Tree-LSTM, achieving a 1.35% improvement in 5-class classification task and a 0.54% improvement in 2-class classification task. LIR performance is slightly worse than GIR, but still achieves 1.15% over 5-class task for Tree-LSTM and 0.27% accuracy for 2-class task. The difference between LIR and GIR can be explained by the fact that LIR pays too much attention to the interaction between local words, but not the global interaction of words in a sentence.

Figure 2A:
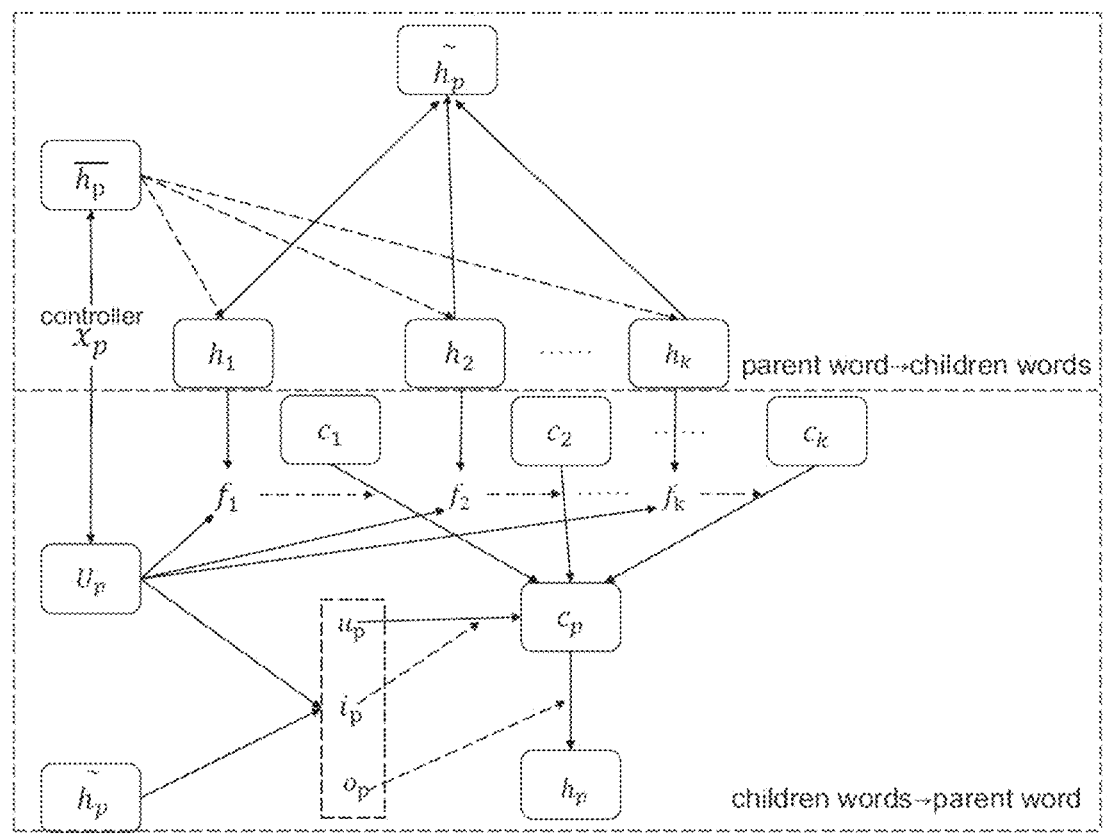
FIG. 2A is a schematic diagram illustrating the relationship between a parent word and a child word in an embodiment of a text representation method applied to sentence embedding according to the invention.
Figure 2B:
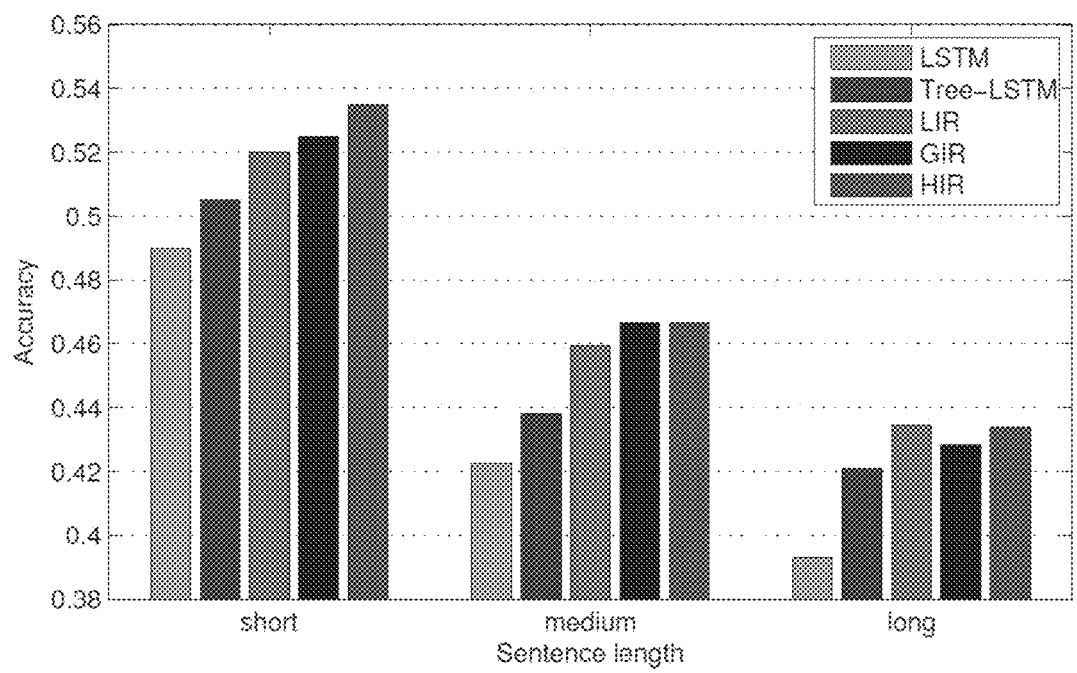
FIG. 2B is a schematic diagram predicting five-class classification task in an embodiment of a text representation method applied to sentence embedding according to the invention.
Figure 2C:
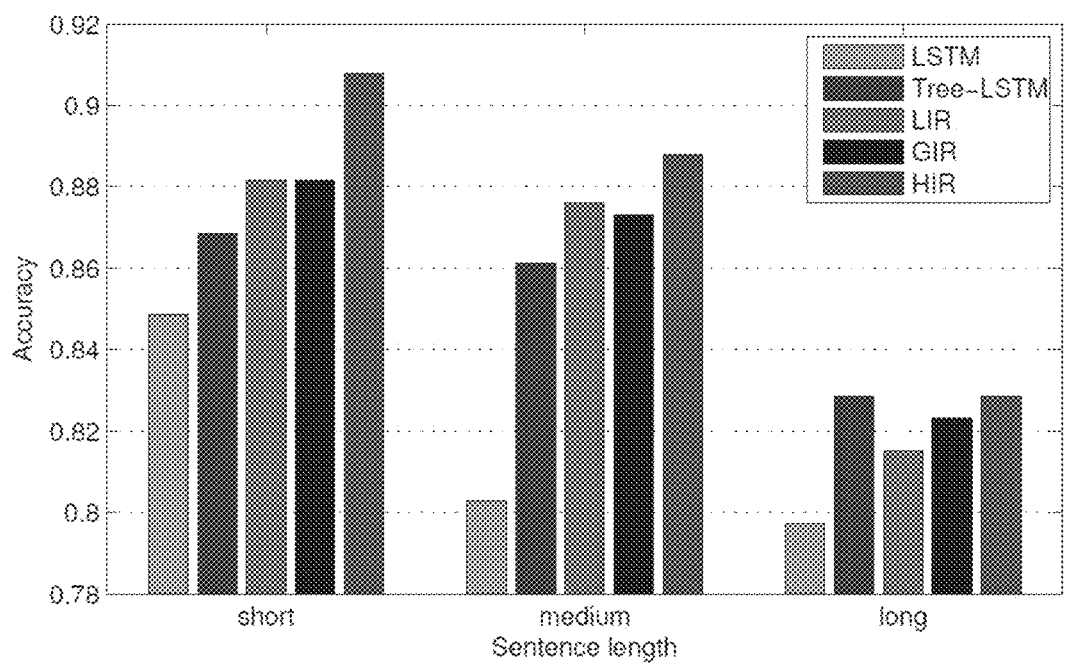
FIG. 2C is a schematic diagram predicting two-class classification task in an embodiment of a text representation method applied to sentence embedding according to the invention.

In order to answer RQ2, the sentences are manually divided into three groups according to the length of the sentence, namely, short sentences ($l \in (0,10)$), medium sentences ($l \in (10,20)$) and long sentences ($l \in (20,+\infty)$). The test results of 5-class classification task and 2-class classification task are drawn on FIG. 2B and FIG. 2C, respectively.

For both classification tasks, it can be observed that as the length of the sentence increases, the performance of all of the models discussed decreases monotonically. The longer the sentence, the more complex the relationship in the sentence, making it harder to get good sentence embedding. For the benchmark model, Tree-LSTM is superior to LSTM for each sentence length in five-class task. The method model proposed by the embodiment generally has an advantage in each sentence in emotional classification. When the length of the sentence is short, medium and long, HIR is 5.94%, 5.86%, and 3.10% higher than Tree-LSTM. This similar phenomenon can also be found in the comparison of LIR, GIR and baseline models. The advantages of characterizing interactions decrease as the length of the sentence increases.

In 2-class task, the results similar to 5-class task were obtained. Compared to the results in FIG. 2B, HIR achieved a greater relative improvement over the baseline model in 5-class task: HIR increased by 5.94%, 5.86% and 3.10% over Tree-LSTM in 5-class task when the length of the sentence is short, medium, and long, respectively; in 2-class task, there is an increase of 4.55%, 3.08% and 0% for the corresponding sentence length. Interestingly, Tree-LSTM managed to catch up with HIR in 2-class task when the sentence length was long.

Figure 3:
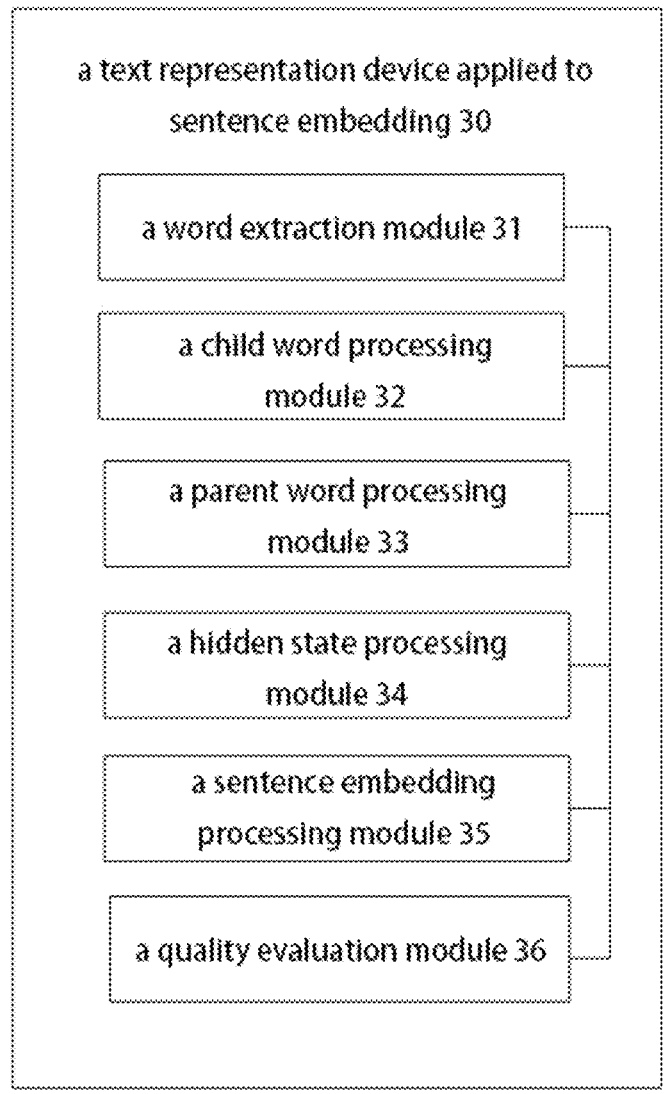
FIG. 3 is a block diagram illustrating an embodiment of a text representation device applied to sentence embedding according to the invention.

As illustrated in FIG. 3, in one embodiment, it provides a text representation device applied to sentence embedding 30, comprising: a word extraction module 31, a child word processing module 32, a parent word processing module 33, a hidden state processing module 34, a sentence embedding processing module 35 and a quality evaluation module 36.

A word extraction module 31 obtains a file to be processed, extracting a sentence from the file; wherein the file includes a text file and a webpage file; obtaining n parent word corresponding to n words in the sentence. A child word processing module 32 determines the parent word and the child words set C(p) corresponding to the parent word, setting hidden states $h_k$ and memory cells $c_k$ for each child words in the C(p), wherein $k \in \{1, 2, \ldots, |C(p)|\}$. A parent word processing module 33 obtains a hidden interaction state $\tilde{h}_p$ of the parent word based on a hidden interaction state of all child words in the C(p), inputting the $\tilde{h}_p$ and the parent word into the LSTM cell to obtain the memory cells and hidden states of the parent word.

A hidden state processing module 34 obtains a sequence $\{x_1, x_2, \ldots, x_n\}$ of parent word corresponding to n parent word as well as obtains a hidden state sequence $\{h_1, h_2, \ldots, h_n\}$ corresponding to the $\{x_1, x_2, \ldots, x_n\}$ based on the hidden state of parent word. A sentence embedding processing module 35 obtains a interaction representation sequence $\{r_1, r_2, \ldots, r_n\}$ of each parent words and other parent words in $\{x_1, x_2, \ldots, x_n\}$ based on the $\{h_1, h_2, \ldots, h_n\}$, generating sentence embeddings based on the $\{r_1, r_2, \ldots, r_n\}$.

Figure 4:
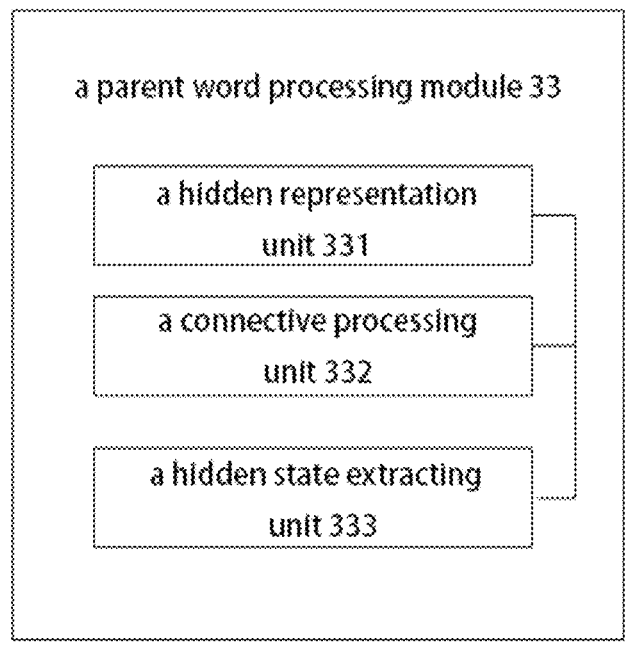
FIG. 4 is a block diagram illustrating a parent word processing module in an embodiment of a text representation device applied to sentence embedding according to the invention.

As illustrated in FIG. 4, the parent word processing module 33 comprises: a hidden representation unit 331, a connective processing unit 332 and a hidden state extracting unit 333. A hidden representation unit 331 converts the parent word $x_p$ into a hidden representation $\overline{h}_p = \tanh(W^{(h)} x_p + b^h)$ wherein, $W^{(h)}$ and $b^h$ are the weight matrix and the bias term, respectively. A connective processing unit 332 connects the $k^{th}$ child words corresponding to the parent word $x_p$ and the parent word $x_p$, obtaining $\alpha_k = \overline{h}_p W_\alpha h_k$, wherein $\alpha_k$ is the connective representation of $\overline{h}_p$ and $h_k$, $W_\alpha$ is a connective matrix. A hidden state extracting unit 333 calculates the word weight $$\lambda_k = \frac{\exp(\alpha_k)}{\sum_{i=1}^{|C(p)|} \exp(\alpha_i)}$$

of the $k^{th}$ child words of the parent word $x_p$; obtaining a hidden interaction state $$\tilde{h}_p = \sum_{i \in C(j)} \lambda_i h_i$$

of the parent word $x_p$; inputting the $\tilde{h}_p$ and the parent word $x_p$ into the LSTM cell to obtain the memory cells and hidden states of the parent word $x_p$.

The hidden state extracting unit 333 uses the hidden interaction state $\tilde{h}_p$ and the parent word $x_p$ as the input to the LSTM cell to get:

$$i_p = \sigma(U^{(i)}x_p + W^{(i)}\tilde{h}_p + b^{(i)});$$

$$o_p = \sigma(U^{(o)}x_p + W^{(o)}\tilde{h}_p + b^{(o)});$$

$$u_p = \tanh(U^{(u)}x_p + W^{(u)}\tilde{h}_p + b^{(u)});$$

$$f_{kp} = \sigma(U^{(f)}x_p + W^{(f)}h_k + b^{(f)});$$

wherein $i_p$, $o_p$ and $f_{kp}$ are the input gate, output gate and forget gate, respectively; $u_p$ is the candidate hidden state of $x_p$; the corresponding weight matrix of $x_p$ are $U^{(i)}$, $U^{(o)}$, $U^{(u)}$ and $U^{(f)}$, the corresponding weight matrix of $\tilde{h}_p$ or $h_k$ are $W^{(i)}$, $W^{(o)}$, $W^{(u)}$ and $W^{(f)}$, the bias terms are $b^{(i)}$, $b^{(o)}$, $b^{(u)}$ and $b^{(f)}$;

the hidden state extracting unit 333 obtains the memory cell of the parent word $x_p$, the memory cell is represented as:

$$c_p = i_p \odot u_p + \sum_{k=1}^{|C(p)|} f_{kp} \odot c_k;$$

the hidden state extracting unit 333 obtains the hidden state of the parent word $x_p$, the hidden state is represented as:

$$h_p = o_p \odot \tanh(c_p).$$

The sentence embedding processing module 35 obtains the connective representation sequence $\{\alpha_{g1}, \alpha_{g2}, \ldots, \alpha_{gn}\}$ between the word $x_g$ in the $\{x_1, x_2, \ldots, x_n\}$ and other words; calculating the interaction weight of word $x_k$ and word $x_g$ in the $\{x_1, x_2, \ldots, x_n\}$, get:

$$\lambda_{gk} = \frac{\exp(\alpha_{gk})}{\sum_{i=1}^{n} \exp(\alpha_{gi})};$$

the sentence embedding processing module 35 obtains the interaction representation of $x_g$ in $\{x_1, x_2, \ldots, x_n\}$, which can be represented as:

$$r_g = \sum_{i=1}^{n} \lambda_{gi} h_i;$$

the sentence embedding processing module 35 enumerates all the words in the $\{x_1, x_2, \ldots, x_n\}$, obtaining the interaction representation sequence $\{r_1, r_2, \ldots, r_n\}$ of the $\{x_1, x_2, \ldots, x_n\}$, generating the sentence embeddings $s = \max\{r_1, r_2, \ldots, r_n\}$.

The quality evaluation module 36 obtains the predicted label corresponding to the sentence embeddings s:

$$\hat{s} = \arg\max p(\mathcal{Y}|s);$$

wherein $\hat{s} \in \mathcal{Y}$, $\mathcal{Y}$ is the class label set; $p(\mathcal{Y}|s) = \text{softmax}(W^{(s)}s + b^{(s)})$; $W^{(s)}$ and $b^{(s)}$ are the reshape matrix and the bias term, respectively; the quality evaluation module 36 sets the loss function:

$$L = -\frac{1}{n}\sum_{i=1}^{n} \log p(\tilde{w}_i | h_i) - \log p(\tilde{s} | s);$$

wherein $h_i$ is the hidden state, $\tilde{w}_i$ is the true class label of word $x_i$, $\tilde{s}$ is the true class label of sentence embeddings s; evaluating the quality of the sentence embeddings s based on the loss function.

Figure 5:
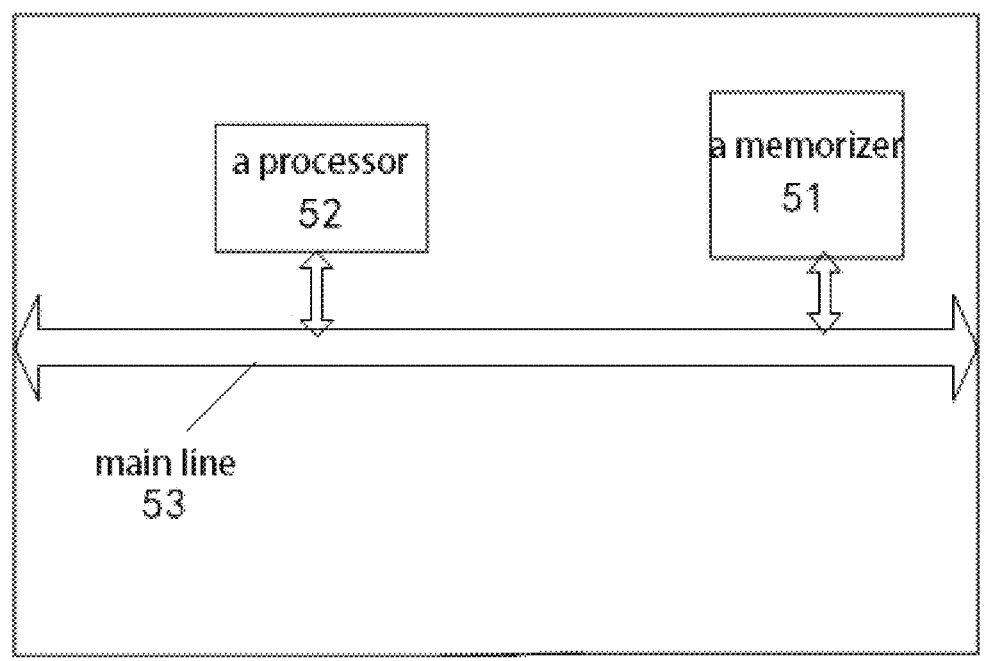
FIG. 5 is a block diagram illustrating another embodiment of a text representation device applied to sentence embedding according to the invention.

In one embodiment, as shown in FIG. 5, it provides a text representation device applied to sentence embedding, comprising: a memorizer 51 and a processor 52; the memorizer 51 is configured to store instructions, the processor 52 is coupled to the memorizer 51; the processor 52 is configured to perform the aforementioned text representation method applied to sentence embedding based on instructions stored in the memorizer 51.

The memorizer 51 can be a high-speed RAM memorizer, a non-volatile memorizer and a memorizer array. The memorizer 51 can also be partitioned and the blocks can be combined into a virtual volume according to certain rules. The processor 52 can be a central processing unit (CPU), or an Application Specific Integrated Circuit (ASIC), or one or more integrated circuits configured to implement the text representation method applied to sentence embedding of the embodiment.

In one embodiment, the embodiment provides a computer readable storage medium, storing computer program instructions, implements the steps of the aforementioned text representation method applied to sentence embedding when the instructions are executed by the processor.

A device and text representation method applied to sentence embedding in the above embodiment proposes to realize sentence embeddings through a two-level interaction representation. The two-level interaction representation is a local interaction representation (LIR) and a global interaction representation (GIR), respectively. The invention combines the two-level representation to generate a hybrid interaction representation (HIR), which can improve the accuracy and efficiency of sentence embeddings and be significantly better than the Tree-LSTM model in terms of accuracy.

The methods and systems of the embodiments can be implemented in a number of ways. For example, the methods and systems of the embodiments can be implemented in software, hardware, firmware or the combinations. The aforementioned sequence of steps for the method is for illustrative purposes only. The steps of the method of the embodiments are not limited to the order specifically described above unless there are specifically statement. Moreover, in some embodiments, they can also be embodied as a program recorded in a recording medium, the program comprising machine readable instructions for implementing the method according to the embodiment. Thus, the embodiment also covers a recording medium storing a program for performing the method according to the embodiment.

We claim:

1. A text representation method applied to sentence embedding, executed by a processor, comprising:
   obtaining a file to be processed and extracting one or more sentences from the file; wherein the file comprises a text file or a webpage file;
   obtaining n parent words corresponding to the one or more sentences, wherein n is a number of the sentences;
   determining, for each parent word of the n parent words, a child words set C(p) corresponding to the parent word, setting hidden states $h_k$ and memory cells $c_k$ for each child word in the C(p), wherein $k \in \{1, 2, \ldots, |C(p)|\}$, and $|C(p)|$ is a number of child words in the C(p);

obtaining a hidden interaction state $\tilde{h}_p$ of each of the parent words based on a hidden interaction state of all child words in the C(p);

inputting each of the $\tilde{h}_p$ and the parent words into a Long-short term memory (LSTM) cell to obtain memory cells and hidden states of each of the parent words;

obtaining a sequence of the parent words $\{x_1, x_2, \ldots, x_n\}$ corresponding to the n parent words and obtaining a hidden state sequence $\{h_1, h_2, \ldots, h_n\}$ corresponding to the $\{x_1, x_2, \ldots, x_n\}$ based on the hidden state of each parent word of the n parent words; and obtaining an interaction representation sequence $\{r_1, r_2, \ldots, r_n\}$ of each parent word in the $\{x_1, x_2, \ldots, x_n\}$ based on $\{h_1, h_2, \ldots, h_n\}$; and generating sentence embeddings s based on the $\{r_1, r_2, \ldots, r_n\}$, wherein the obtaining the hidden interaction state $\tilde{h}_p$ comprises:

converting each parent word $x_p$ into a hidden representation $\overline{h}_p = \tanh(W^{(h)} x_p + b^h)$; wherein $W^{(h)}$ is a weight matrix and $b^h$ is a bias term;

connecting each parent word $x_p$ and each child word in the corresponding child word set C(p), obtaining $\alpha_k = \overline{h}_p W_\alpha h_k$, wherein $\alpha_k$ is a connective representation of both $\overline{h}_p$ and the hidden state $h_k$, $W_\alpha$ is a connective matrix to be learned, and k is a number of the child words in the corresponding child word set C(p);

calculating a word weight $$\lambda_k = \frac{\exp(\alpha_k)}{\sum_{i=1}^{|C(p)|} \exp(\alpha_i)}$$

of each child word in the corresponding child word set C(p); and obtaining, for each parent word $x_p$, the hidden interaction state $$\tilde{h}_p = \sum_{i \in C(j)} \lambda_i h_i$$

that relates to all child states of the parent word $x_p$;

wherein the text representation method is applied to an emotional classification task to achieve emotional classification of the one or more sentences with enhanced accuracy.

2. The text representation method of claim 1, wherein the inputting comprises:

inputting each parent word $x_p$ and each hidden interaction state $\tilde{h}_p$ corresponding to each parent word $x_p$ into the LSTM cell to obtain:

$i_p = \sigma(U^{(i)} x_p + W^{(i)} \tilde{h}_p + b^{(i)})$;

$o_p = \sigma(U^{(o)} x_p + W^{(o)} \tilde{h}_p + b^{(o)})$;

$u_p = \tanh(U^{(u)} x_p + W^{(u)} \tilde{h}_p + b^{(u)})$;

$f_{kp} = \sigma(U^{(f)} x_p + W^{(f)} h_k + b^{(f)})$;

wherein $i_p$ is an input gate, $o_p$ is an output gate, $f_{kp}$ is a forget gate, $u_p$ is a candidate hidden state of $x_p$, $U^{(i)}$, $U^{(o)}$, $U^{(u)}$ and $U^{(f)}$ are corresponding weight matrices of $x_p$, $W^{(i)}$, $W^{(o)}$, $W^{(u)}$ and $W^{(f)}$ are corresponding weight matrices of $\tilde{h}_p$, and $b^{(i)}$, $b^{(o)}$, $b^{(u)}$ and $b^{(f)}$ are bias terms;

obtaining a memory cell $c_p$ of each parent word $x_p$, wherein the memory cell $c_p$ is represented as:

$$c_p = i_p \odot u_p + \sum_{k=1}^{|C(p)|} f_{kp} \odot c_k;$$

and obtaining a hidden state $h_p$ of the parent word $x_p$, wherein the hidden state $h_p$ is represented as:

$h_p = o_p \odot \tanh(c_p)$.

3. The text representation method of claim 2, wherein the generating sentence embeddings based on the $\{r_1, r_2, \ldots, r_n\}$ comprises:

obtaining, for each of the parent words in the $\{x_1, x_2, \ldots, x_n\}$, a connective representation sequence $\{\alpha_{g1}, \alpha_{g2}, \ldots, \alpha_{gn}\}$ between each reference parent word $x_g$ in the $\{x_1, x_2, \ldots, x_n\}$ and other parent words $x_k$ in the $\{x_1, x_2, \ldots, x_n\}$;

calculating an interaction weight $\lambda_{gk}$ of each of the other parent words $x_k$ and each reference parent word $x_g$ in the $\{x_1, x_2, \ldots, x_n\}$ according to:

$$\lambda_{gk} = \frac{\exp(\alpha_{gk})}{\sum_{i=1}^n \exp(\alpha_{gi})};$$

obtaining an interaction representation $r_g$ for each reference parent word $x_g$ in $\{x_1, x_2, \ldots, x_n\}$ according to:

$$r_g = \sum_{i=1}^n \lambda_{gi} h_i;$$

obtaining the interaction representation sequence $\{r_1, r_2, \ldots, r_n\}$ for each of the parent words in the $\{x_1, x_2, \ldots, x_n\}$, and generating, for each of the parent words in the $\{x_1, x_2, \ldots, x_n\}$ the sentence embeddings s according to $s = \max\{r_1, r_2, \ldots, r_n\}$.

4. The text representation method of claim 3, further comprising:

obtaining a predicted label $\hat{s}$ corresponding to the sentence embeddings s:

$\hat{s} = \arg \max p(\mathcal{Y} | s)$;

wherein $\hat{s} \in \mathcal{Y}$, $\mathcal{Y}$ is a class label set; $p(\mathcal{Y}|s) = \text{softmax}(W^{(s)} s + b^{(s)})$; $W^{(s)}$ is a reshape matrix, and $b^{(s)}$ is a bias term;

setting a loss function L according to:

$$L = -\frac{1}{n} \sum_{i=1}^n \log p(\tilde{w}_i | h_i) - \log p(\tilde{s} | s);$$

wherein $h_i$ is a hidden state, $\tilde{w}_i$ is a true class label of a parent word $x_i$, $\tilde{s}$ is a true class label of the sentence embeddings s; and evaluating a quality of the sentence embeddings s based on the loss function L.

5. A text representation device applied to sentence embedding comprising:
- a word extraction module, configured to obtain a file to be processed and extract one or more sentences from the file; wherein the file comprises: a text file or a webpage file; and obtain n parent words corresponding to the one or more sentences, wherein n is a number of the sentences;
- a child word processing module, configured to determine, for each parent word of the n parent words, a child word set C(p) corresponding to the parent word, setting hidden states $h_k$ and memory cells $c_k$ for each child word in the C(p), wherein $k \in \{1, 2, \ldots, |C(p)|\}$ and $|C(p)|$ is a number of child words in the C(p);
- a parent word processing module, configured to obtain hidden interaction states $\tilde{h}_p$ of each of the parent words based on the hidden interaction states of all child words in the C(p);
- inputting each of the $\tilde{h}_p$ and the parent words into a Long-short term memory (LSTM) cell to obtain the memory cells and hidden states of each of the parent words;
- a hidden state processing module, configured to obtain a sequence $\{x_1, x_2, \ldots, x_n\}$ of parent words corresponding to n parent words and obtain a hidden state sequence $\{h_1, h_2, \ldots, h_n\}$ corresponding to the $\{x_1, x_2, \ldots, x_n\}$ based on the hidden state of each parent word of the n parent words; and
- a sentence embedding processing module, configured to obtain an interaction representation sequence $\{r_1, r_2, \ldots, r_n\}$ of each parent word in the $\{x_1, x_2, \ldots, x_n\}$ based on the $\{h_1, h_2, \ldots, h_n\}$, and generating sentence embeddings s based on the $\{r_1, r_2, \ldots, r_n\}$;
- wherein the parent word processing module further comprises:
  - a hidden representation unit, configured to convert each parent word $x_p$ into a hidden representation $\overline{h}_p = \tanh(W^{(h)} x_p + b^h)$; wherein, $W^{(h)}$ and $b^h$ is a weight matrix and $b^h$ is a bias term;
  - a connective processing unit, configured to connect each child word in the corresponding child word set C(p) and each parent word $x_p$, obtaining $\alpha_k = \overline{h}_p W_\alpha h_k$, wherein $\alpha_k$ is the connective representation of $\overline{h}_p$ and $h_k$, $W_\alpha$ is a connective matrix and k is a number of the child words in the corresponding child word set C(p); and
  - a hidden state extracting unit, configured to calculate a word weight $$\lambda_k = \frac{\exp(\alpha_k)}{\sum_{i=1}^{|C(p)|} \exp(\alpha_i)}$$

of each child word in the corresponding child word set C(p); obtaining, for each parent word $x_p$, the hidden interaction state $$\tilde{h}_p = \sum_{i \in C(j)} \lambda_i h_i;$$

wherein the text representation method is applied to an emotional classification task to achieve emotional classification of the one or more sentences with enhanced accuracy.

6. A text representation device of claim 5, wherein:
the hidden state processing module is configured to input each parent word $x_p$ and the hidden interaction state $\tilde{h}_p$ corresponding to each parent word $x_p$ into the LSTM cell to obtain:

$i_p = \sigma(U^{(i)} x_p + W^{(i)} \tilde{h}_p + b^{(i)})$;

$o_p = \sigma(U^{(o)} x_p + W^{(o)} \tilde{h}_p + b^{(o)})$;

$u_p = \tanh(U^{(u)} x_p + W^{(u)} \tilde{h}_p + b^{(u)})$;

$f_{kp} = \sigma(U^{(f)} x_p + W^{(f)} h_k + b^{(f)})$;

wherein $i_p$ is an input gate, $o_p$ is an output gate, $f_{kp}$ is a forget gate, $u_p$ is a candidate hidden state of $x_p$, $U^{(i)}$, $U^{(o)}$, $U^{(u)}$ and $U^{(f)}$ are corresponding weight matrices of $x_p$, $W^{(i)}$, $W^{(o)}$, $W^{(u)}$ and $W^{(f)}$ are corresponding weight matrices of $\tilde{h}_p$, and $b^{(i)}$, $b^{(o)}$, $b^{(u)}$ and $b^{(f)}$ are bias terms;

the hidden state processing module is configured to obtain a memory cell $c_p$ of each parent word $x_p$, wherein the memory cell $c_p$ is represented as:

$$c_p = i_p \odot u_p + \sum_{k=1}^{|C(p)|} f_{kp} \odot c_k;$$

and the hidden state processing module is configured to obtain a hidden state $h_p$ of each parent word $x_p$, the hidden state $h_p$ is represented as:

$h_p = o_p \odot \tanh(c_p)$.

* * * * *